May 20, 1924.

R. M. ABRAHAM

THEODOLITE, SPECTROSCOPE, AND THE LIKE

Filed June 11, 1923

1,494,565

INVENTOR
Robert M. Abraham
By Hubert A. Gill
Attorney

Patented May 20, 1924.

1,494,565

UNITED STATES PATENT OFFICE.

ROBERT M. ABRAHAM, OF WESTMINSTER, LONDON, ENGLAND.

THEODOLITE, SPECTROSCOPE, AND THE LIKE.

Application filed June 11, 1923. Serial No. 644,704.

*To all whom it may concern:*

Be it known that I, ROBERT MORRISON ABRAHAM, a British subject, and resident of 49 and 50 Parliament Street, Westminister, S. W. 1, in the county of London, England, have invented certain new and useful Improvements in Theodolites, Spectroscopes, and the like, for which I have filed applications in England dated 14th December, 1922, and 9th March, 1923, of which the following is a specification.

This invention relates to theodolites, spectroscopes and other optical measuring instruments which are furnished with a sighting device having an eyepiece with webs movable by a micrometer for measuring purposes. The present invention has particular application to a theodolite or like instrument furnished with an optical system as set forth in the specification of my patent application U. S. A. Serial No. 638530 filed 12th May, 1923.

Micrometer eyepieces for optical systems are usually arranged with a sliding frame within the eyepiece carrying the cross webs and adjusted by the micrometer head. In order to indicate the amount of movement of the webs necessary to bring them into position for taking a reading, the micrometer head usually has a cylindrical scale or graduated drum arranged to turn with the head and to co-act with a fixed pointer or mark. In such an arrangement it has always been necessary hitherto to observe the cross webs through the eyepiece as the micrometer head is turned and then to take a separate reading upon the cylindrical scale or graduated drum controlled by the micrometer head and arranged externally to the eyepiece. It is the object of the present invention to enable the observation of the cross webs and the reading of the micrometer to be taken without removing the eye from the eyepiece.

According to the present invention, the micrometer scale or graduated drum is arranged within the eyepiece so that it can be viewed at the same time as the cross-webs. The drum is connected to the micrometer spindle so as to be rotated with it, but not to be traversed with the frame carrying the cross webs. This may be effected by mounting the drum upon a spindle passing centrally through a screw-threaded rod carrying the web frame and arranged to be rotated together with the micrometer head, which is formed upon a nut engaging with the threaded rod. The central spindle carrying the drum may be driven frictionally from the micrometer head so as to be capable of separate rotation when desired by the operator for the purposes of setting the zero.

By way of example, a construction of eyepiece in accordance with the present invention adapted for use with a double reading optical system arranged in accordance with my patent application U. S. A. Serial No. 638530 filed 12th May, 1923, illustrated in the accompanying drawings, in which:—

The eyepiece tube 1 is enlarged towards one end at 2 to accommodate the micrometer mechanism. The latter has a body portion 3 approximately cylindrical and fitting within the tubular enlargement 2, but its lower portion 4 has flat sides adapted to be guided within a slot in the lower portion of the enlargement 2, which serves to prevent rotation of the body portion 3.

Figure 1:
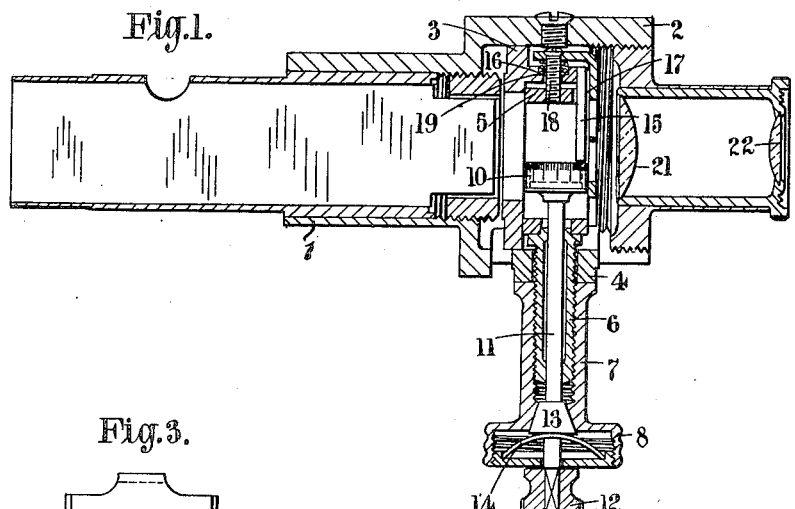
Figure 1 is a vertical longitudinal section through the eyepiece.
Figure 3:
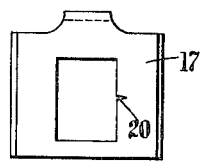
Figure 3 is a corresponding view of the mask.
Figure 2:
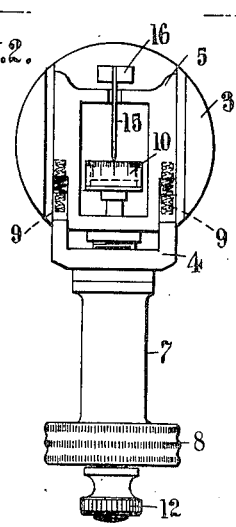
Figure 2 is an end elevation of the internal member of the micrometer shown with its front mask removed.
Figure 4:
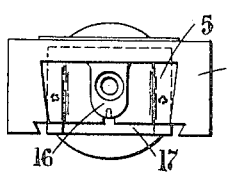
Figure 4 is a plan of the parts shown in Figures 2 and 3 in normal positions.

The shape of the sliding frame 5 which carries the cross webs is seen clearly in Figure 2. It makes a good fit within a dove-tailed groove in the body portion 3 and has a downward extension 6 in the form of a screw-threaded rod, best seen in Figure 1. The extension 6 is engaged by a tubular nut formed by an internally screw-threaded extension 7 of the micrometer head 8. The tubular nut 7 is maintained in contact with the lower portion 4 of the fixed body by means of a pair of compression springs 9 which thus tend to press the sliding frame 5 upwards. Upon rotating the micrometer head 8, the rod 6 is drawn down within the tubular nut 7 and draws the frame 5 downward with it, thus compressing the springs 9. The micrometer scale or graduated drum 10 is carried by a central spindle 11 to which is secured a separate milled head 12 and which carries a conical collar 13 normally pressed on to a conical setting in the tubular nut 7 by a blade spring 14. Thus normally, there is frictional engagement between the collar 13 and the nut 7, so that when the milled head 8 is rotated the sliding frame 5 is traversed and the micrometer graduated drum or scale 10 is rotated, but the latter is not moved axially. The drum or scale 10 co-acts with a fixed pointer 15 which is carried by and projects downwardly from a fixed bracket 16 carried by the fixed body 3.

The flat metal mask 17 is carried in shallow dove-tailed grooves in the body 3 in front of the sliding frame 5. After preliminary adjustment, this mask is not moved but for the purpose of the preliminary adjustment, a screw 18 surrounded by a spring 19 is employed. The screw is screwed in and the spring 19 compressed until the mask 17 has been pushed down sufficiently. The mask 17 has a V-shaped notch 20 to one side. Clearly the mask 17 lies between the frame 5 carrying the cross webs and the lenses 21, 22 of the eyepiece.

Figure 5:
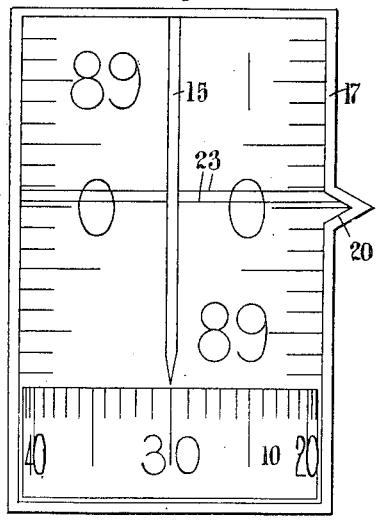
Figure 5 is an enlarged view showing the appearance of the scales seen through the eyepiece.

In order to set the sliding frame 5 to its true zero position after the micrometer fitting has been focused by means of the lens 22, the webs are adjusted by turning the micrometer head 8 until they read exactly zero on the scale to be observed. In the case of a theodolite horizontal scale, the webs will be adjusted to read 0 degrees and 180 degrees. In the example illustrated, the eyepiece is arranged as part of an optical system by which two opposite parts of the vertical scale of a theodolite are observed simultaneously in the manner set forth in the specification of my patent application U. S. A. Serial No. 638530 filed 12th May, 1923. These two opposite parts of the scale thus appear side by side in the field of the eyepiece, as shown in Figure 5. The cross webs 23 are seen in that figure close to the zero mark on opposite parts of the scale, it being assumed that the vertical scale is graduated in four quadrants. When the webs are set to the true zero, the front mask 17 is raised or lowered by means of the screw 18 and the spring 19 until the V-notch 20 co-incides with the webs 23. The notch 20 is only intended to serve as a rough indication to show when the zero adjustment is on the correct thread of the screw 6, so that it can be readily seen that the zero adjustment is not one or more complete turns of the screw 6 too high or too low.

In the arrangement illustrated, as seen in Figure 5, the micrometer is assumed to be arranged so that one complete turn of its head moves the cross webs an amount corresponding to ten minutes of angle on the vertical scale of the theodolite. The graduated drum 10 is sub-divided into sixty divisions so that a movement of the micrometer head causing a movement of the drum 10 equal to one division is equivalent to a movement of ten seconds of angle. When it is necessary to set the micrometer drum 10 to its zero position after the cross webs have been set true to zero, the micrometer head 8 is held stationary by the left hand and the scale 10 set to its true zero by rotating the milled head 12 by the right hand. This presents no difficulty because the conical collar 13 is only friction tight. Then in taking a reading, the head 8 is turned until the cross webs 23 appear to be disposed equally on opposite sides of the nearest graduation on the theodolite scale. During the rotation of the head 8, the stem 11 and scale 10 rotate with it and the amount the sliding frame 5 has been advanced or drawn back in making the adjustment is indicated by the pointer 15 on the scale 10. This is added or subtracted, as the case may be, from the reading corresponding to the graduation in question on the theodolite scale.

Having thus described my invention what I claim as new and desire to secure by Letters Patent is:—

1. An eyepiece for optical measuring instruments, comprising in combination an eyepiece tube, lenses mounted therein, a sliding sighting device within said eyepiece, a micrometer for traversing said sighting device across the field of the eyepiece and a cylindrical scale located within said eyepiece and rotated by said micrometer.

2. An eyepiece for optical measuring instruments, comprising in combination an eyepiece tube, lenses mounted therein, a sighting device slidably mounted within said eyepiece, a micrometer for traversing said sighting device across the field of said eyepiece and a cylindrical scale located within said eyepiece and operatively related to said micrometer and to said sighting member as to be rotated by said micrometer but not traversed with said sighting device.

3. A micrometer eyepiece for optical measuring instruments, comprising an eyepiece tube, lenses mounted therein, a sliding frame constituting a sighting device mounted within said eyepiece, a screw-threaded stem integral with said frame and a tubular nut engaging said stem and constituting a micrometer and a cylindrical scale located within said eyepiece and rotatively connected to said tubular nut.

4. A micrometer eyepiece for optical measuring instruments, comprising an eyepiece tube, lenses mounted therein, a sliding frame constituting a sighting device mounted within said eyepiece, a screw-threaded stem integral with said frame, a tubular nut engaging said stem and constituting a micrometer and a cylindrical scale in frictional driving relation with said tubular nut.

5. A micrometer eyepiece for optical measuring instruments, comprising in combination an eyepiece tube, lenses mounted therein, a sliding frame mounted within said eyepiece to constitute a sighting device, a hollow screw-threaded stem integral with said frame, a tubular nut formed with a milled ring engaging said screw-threaded stem to constitute a micrometer, a central stem passing axially through said screw-threaded stem and a cylindrical micrometer scale carried by the inner end of said central stem.

6. A micrometer eyepiece for measuring instruments, comprising in combination an eyepiece tube, lenses mounted therein, a sliding frame serving as a sighting device, a screw-threaded hollow stem integral with said frame, a tubular nut formed with a milled ring and engaging said screw-threaded stem to constitute a micrometer, a central stem passing through said hollow stem, a cylindrical scale carried by the inner end of said central stem and resilient means for maintaining said central stem and said tubular nut in frictional driving engagement.

7. A micrometer eyepiece for optical measuring instruments, comprising in combination an eyepiece tube, lenses mounted therein, a sliding frame serving as a sighting device, a micrometer for traversing said frame across the field of said eyepiece, a cylindrical scale located within said eyepiece and related to said micrometer so as to rotate therewith and a pointer carried by said eyepiece tube to co-act with said cylindrical scale.

8. A micrometer eyepiece for optical measuring instruments, comprising in combination an eyepiece tube, lenses mounted therein, a sliding frame serving as a sighting device, a micrometer for traversing said frame across the field of said eyepiece, a cylindrical scale located within said eyepiece and related to said micrometer so as to rotate therewith, a pointer carried by the fixed eyepiece tube co-acting with said cylindrical scale and a mask adjustably fixed in front of said frame and carrying a zero-setting indication.

In witness whereof, I hereunto subscribe my name this 31st day of May A. D. 1923.

ROBERT M. ABRAHAM.